United States Patent
Guido et al.

[11] Patent Number: 5,775,302
[45] Date of Patent: Jul. 7, 1998

[54] FUEL DISTRIBUTOR PIPE

[75] Inventors: Jürgen Guido; Norbert Binzer, both of Neutraubling, Germany

[73] Assignee: Jurgen Guido, Neutraubling, Germany

[21] Appl. No.: 808,961

[22] Filed: Feb. 19, 1997

[30] Foreign Application Priority Data

Feb. 28, 1996 [DE] Germany ............... 196 07 521.1

[51] Int. Cl.⁶ .................................................. F02M 37/04
[52] U.S. Cl. .................. 123/468; 123/469; 123/456; 285/329
[58] Field of Search ........................... 123/468, 469, 123/470, 456, 467; 285/329, 332, 332.2

[56] References Cited

U.S. PATENT DOCUMENTS

| | | | |
|---|---|---|---|
| 4,445,713 | 5/1984 | Bruning | 123/469 |
| 4,893,601 | 1/1990 | Sugao | 123/469 |
| 5,072,710 | 12/1991 | Washizu | 123/470 |
| 5,301,647 | 4/1994 | Lorraine | 123/456 |
| 5,365,907 | 11/1994 | Dietich | 123/470 |
| 5,617,828 | 4/1997 | Kuegel | 123/470 |

FOREIGN PATENT DOCUMENTS

| | | | |
|---|---|---|---|
| 1234806 | 10/1960 | France | 123/461 |
| 4066769 | 3/1992 | Japan | 123/468 |

Primary Examiner—Carl S. Miller
Attorney, Agent, or Firm—Sughrue, Mion, Zinn, Macpeak & Seas, PLLC

[57] ABSTRACT

A fuel distributor pipe (1) which can be subjected to a high internal pressure loading includes at least one connecting arrangement (12) serving for releasably connecting a branch pipe (3) and having a connecting bore (5) which extends radially through the wall of the distributor pipe and which has an inner portion (8) and an adjoining, outer portion (9) which enlarges in a hollow-conical configuration, a screwthreaded socket (12) which is connected to the distributor pipe and whose internal bore (15) extending therethrough continues the connecting bore and serves to receive the branch pipe, and a pressing element (22) having a pressure surface (23) which, when the pressing element is screwed on to a counter-pressure surface (24) provided on a thickened portion (25) of the branch pipe, exerts a force by which a counter-sealing surface (16) of the branch pipe is pressed against the conical wall (18) of the outer portion of the connecting bore. To simplify manufacture while at the same time guaranteeing a sealing connecting which can withstand the high operating pressures, it is provided that the end of the screwthreaded socket, which is towards the distributor pipe, is applied at the end to the outside of the distributor pipe and is connected thereto.

7 Claims, 1 Drawing Sheet

FUEL DISTRIBUTOR PIPE

BACKGROUND OF THE INVENTION

The invention concerns a fuel distributor pipe of the kind set forth in the classifying portion of claim 1.

Such distributor pipes or manifolds are suitable in particular for use as high-pressure storage means in Diesel engines with a common rail system. That term is used to denote injection systems in which a solenoid valve is associated with each of the cylinders, instead of an injection pump; the valve controls the flow passageway through a branch pipe which connects the respective injection nozzle to a central high-pressure storage means which is common to all cylinders and to which a high-pressure pump substantially uniformly feeds fuel. The pressure in the storage means is regulated in dependence on the operating condition of the engine, and the solenoid valves are controlled in such a way that they briefly open at each of the correct moments in time and thus permit injection, into the associated cylinder, of the fuel which is available in the high-pressure storage means and the branch pipes.

As the branch pipes which lead to the individual cylinders must be releasably connectable to the high-pressure storage means, the general problem which arises is that of providing for each of them a connecting arrangement which permits assembly which is as quick and easy as possible and which—when carrying out maintenance and/or repair operations—also permits the branch pipes to be removed from and re-fitted to the high-pressure storage means, and which ensures a reliably sealing connection in spite of the extremely high operating pressures which can be of the order of magnitude of up to 1600 bars.

For that purpose it is known for example, from German laid-open application (DE-OS) No 38 17 413, (corresponding to U.S. Pat. No. 4,832,376) to provide for each branch pipe a sleeve which is pushed on to the distributor pipe and which embraces the distributor pipe and which has a screwthreaded socket which extends radially with respect to the longitudinal axis of the distributor pipe, the screwthreaded socket having a cylindrical internal cavity extending therethrough, which cavity terminates at one side at the peripheral surface of the distributor pipe while the other end thereof is open so that, from that location, it is possible to introduce the connecting end of a branch pipe, on which a sealing nipple is formed by upsetting. Each of the sleeves is so positioned on the distributor pipe that the internal cavity of its screwthreaded socket extends coaxially with respect to a connecting bore which extends radially through the wall of the distributor pipe and which comprises an inner, substantially cylindrical portion and an outer portion which enlarges in a hollow conical configuration towards the internal cavity of the screwthreaded socket.

The wall of the hollow-conical portion serves as a sealing surface and a corresponding counter-sealing surface of the sealing nipple which is formed by upsetting at the connecting end of the branch pipe is sealingly pressed against the wall of the hollow-conical portion, by virtue of the fact that a union screw which is disposed around the branch pipe is screwed into a female screwthread in the screwthreaded socket and tightened, in which case the union screw presses against a counter-pressure surface provided at the side of the sealing nipple, which is opposite to the counter-sealing surface.

That known structure is admittedly suitable for releasably fitting branch pipes to the distributor pipe in such a way as to provide a sealed connection which withstands the high operating pressures, but it nonetheless suffers from a series of problems:

The most substantial disadvantage is that, besides the actual screwthreaded socket, the connecting sleeves also have a connecting portion whose volume must be so great that the internal bore, which passes through it for receiving the distributor pipe, is enclosed by a wall of adequate thickness or gauge. If the distributor pipe is of a comparatively small outside diameter, that still results in the known sleeves being of fairly acceptable dimensions; for distributor pipes of substantially larger outside diameter, however, the known sleeves would become extremely bulky and would consume a large amount of material and would be of a highly detrimental installation size.

In addition the operation of pushing the known sleeves onto the distributor pipe, which is required in the first assembly operation, can result in difficulties in particular if the distributor pipe is not of a straight linear configuration but is curved (and possibly even has a plurality of curves). It is practically impossible to position the known connecting arrangement directly in the region of a curved portion of the distributor pipe.

SUMMARY OF THE INVENTION

In comparison therewith, the object of the present invention is so to develop a fuel distributor pipe of the kind set forth in the opening part of this specification, that, with few bulky, simpler and therefore more advantageous components which can be positioned at virtually any locations on the distributor pipe, the invention provides a connecting arrangement which is at least equivalent inefficiency to the arrangements known from the state of the art, in regard to the simplicity with which initial fitting, removal and refitting of the branch pipes can be effected and also in regard to the sealing integrity of the connections produced.

The invention is based on the realisation that, for the desired aims, it is entirely sufficient for the screwthreaded socket to be of such a design configuration that with its one end face, it can be applied at this end face directly to the outside surface of the distributor pipe and secured there, preferably by welding. The connection produced in that case only has to be capable of reliably and permanently carrying the pressures which are exerted by screwing and tightening the pressing element; in contrast they do not have to satisfy any requirements in regard to sealing integrity because the seal which is resistant to high pressure is produced between the counter-sealing surface provided at the end of the branch pipe and the tapered peripheral surface of the outer portion of the connecting bore.

It is particularly desirable in that respect that, to produce that outer portion, the distributor pipe has to be only very shallowly bored from the exterior in a wall region which is not subjected to a very high loading by the internal pressure.

By virtue of the screwthreaded socket being applied at its end against the outside of the distributor pipe, the sleeve portion which was required in the state of the art can be totally eliminated so that this arrangement provides a component which requires a considerably smaller amount of material and occupies a considerably smaller amount of space and whose size is moreover virtually independent of the diameter of the distributor pipe. There is no need for a pushing-on operation, in the initial assembly procedure.

In principle the screwthreaded sockets according to the invention can be applied to and connected to the distributor pipe at any locations, in particular also in the immediate vicinity of or even at curved regions of the distributor pipe.

It is possible for the end of the screwthreaded socket, which is to be applied to the distributor pipe, to be of a saddle-shaped configuration in order to provide for adaptation to the curved outside surface of the high-pressure storage means pipe. Preferably, however, a flat is provided on the pipe in the region of the respective connecting location so that the screwthreaded socket can be applied to the distributor pipe with a flat end face in butting relationship, and secured thereto.

In accordance with a particularly preferred embodiment the screwthreaded socket is provided with a male screwthread, on to which a union nut serving as a pressing element can be screwed.

These and further advantageous configurations of the distributor pipe according to the invention are recited in the appendant claims.

The invention is described hereinafter by means of an embodiment with reference to the drawing in which:

DESCRIPTION OF A PREFERRED EMBODIMENT

Figure 1:
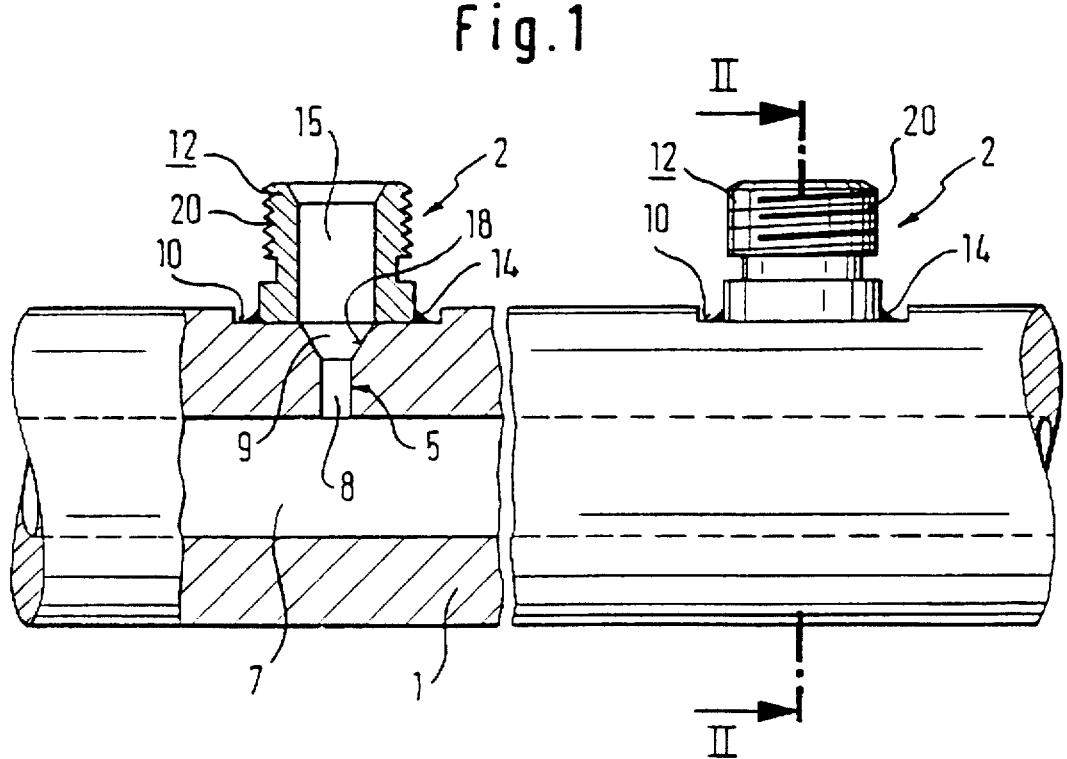
FIG. 1 is a partly sectional side view of a shortened portion of a fuel distributor pipe according to the invention, wherein union nuts and branch pipes have been omitted.

Referring to FIG. 1, shown therein is a thick-wall fuel distributor pipe 1 which can be used in internal combustion engines with a common rail system as a high-pressure storage means. For that purpose the pipe has for example at one end (not shown) a connection to a delivery conduit which comes from a pump and which is designed in the same manner as is described hereinafter for the connecting arrangements 2 shown in the Figures, for the connection of branch pipes 3.

Figure 2:
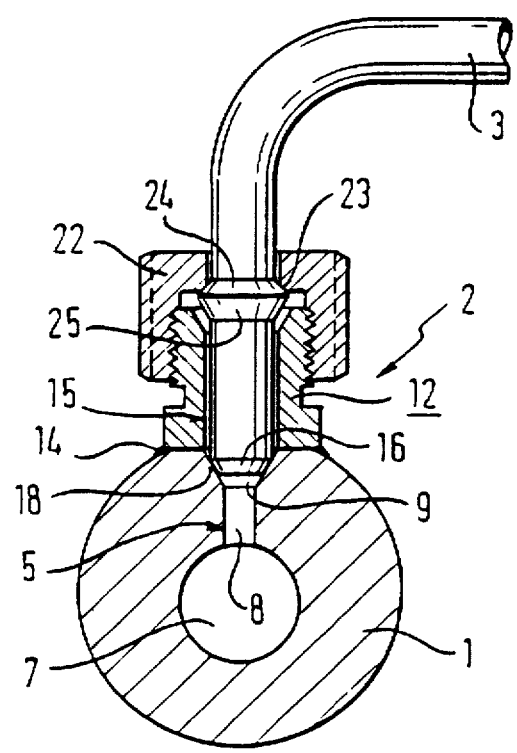
FIG. 2 is a view in section taken along line II—II in FIG. 1 in the fully assembled condition with union nut and connecting pipe.

As can be seen from FIGS. 1 and 2 each of those connecting arrangements 2 includes a connecting bore 5 which, starting from the internal cavity 7 of the distributor pipe 1, extends through the thick pipe wall which is adapted to the high internal pressure, in a direction which extends substantially radially with respect to the longitudinal direction of the distributor pipe 1 but which defines the axial direction in regard to the respective connecting arrangement 2.

In the last-mentioned direction, each of the connecting bores 5 comprises two immediately mutually adjoining portions of which the inner portion 8 is in the form of a hollow cylinder and is of a greater axial length than the outer portion 9 which opens outwardly in a hollow-conical configuration.

The mouth opening of the outer hollow-conical portion 9 at the outer peripheral surface of the distributor pipe 1 is surrounded by a recess 10 which is for example rectangular in plan view and which is machined from the exterior, to a shallow depth, into the peripheral surface of the distributor pipe 1 in order to provide a flat fitting surface for a screwthreaded socket 12 which is applied with its one end face in butting relationship against the flat fitting surface and which is connected to the distributor pipe 1, for example by a weld 14.

The screwthreaded socket 12 has an internal bore 15 which extends therethrough coaxially with respect to the connecting bore 5 and whose diameter is approximately equal to the largest diameter of the outer portion 9 of the connecting bore 5, which enlarges in a hollow-conical configuration. Accordingly the internal bore 15 of the screwthreaded socket 12 which is welded on to the distributor pipe 1, together with the outer portion 9 of the connecting bore 5, forms a cavity into which the connecting end of a branch pipe 3 can be inserted, from the free end of the screwthreaded socket 12, to such an extent until a counter-sealing surface 16 provided on said connecting end comes to bear against the peripheral surface, which serves as a sealing surface 18, of the hollow-conical outer portion 9 of the connecting bore 5. If the counter-sealing surface 16 is of a spherical configuration, that arrangement initially produces only a line contact.

In order here to produce a sealing effect which can withstand the high operating pressures of a common rail system, the screwthreaded socket 12 has in the region of its free end a male screwthread 20 on to which can be screwed a union nut 22 which is pushed on to the branch pipe 3 and which, with a pressure surface 23 at the inside of its end wall portion, can act against a counter-pressure surface 24 which is provided on a thickened portion 25 of the branch pipe 3, the thickened portion 25 being produced for example by upsetting.

So that the pressure surface 23 can be formed directly at the edge region at which the opening that permits the branch pipe 3 to pass through the end portion of the union nut 20 constitutes a transition to the inside surface of that end portion, it is necessary for the axial spacing between the thickened portion 25 and the counter-sealing surface 16 provided at the outermost connecting end of the branch pipe 3 to be so great that, in the assembled condition, the thickened portion 25 projects at least with the pressure surface 24 somewhat beyond the free end of the screwthreaded socket 12. As the screwthreaded socket 12 must be of a sufficient axial length to be able to provide thereon the screwthread required for screwing the union nut, the thickened portion 25, unlike conventional sealing nipples, is not provided end connecting of the branch pipe 3 but at a suitable distance from that end. To provide sufficient space for the thickened portion 25, the otherwise cylindrical internal bore 15 in the screwthreaded socket 12 enlarges in a hollow-conical configuration towards its free end.

It should however be expressly pointed out that, in the connecting arrangement 1 according to the invention, no seal is provided in the region of the thickened portion 25, in regard to the fuel which is disposed in the interior of the system and which is under a high pressure. In this arrangement, tightening the union nut 22 only produces the force which is required to press the counter-sealing surface 16 at the connecting end of the branch pipe 3 against the sealing surface 18 of the connecting bore 5 in such a way that, by virtue of plastic deformation of the counter-sealing surface 16, the above-mentioned line contact becomes an annular surface at which the end of the branch pipe 3 and the sealing surface 18 are in contact with each other in such a fashion that it is exclusively here that the entire sealing effect required is produced.

That affords the advantage that the weld 14 only has to carry the pressing forces, but does not itself need to be pressure-tight.

As can be seen in particular from FIG. 2, the use of a union nut 22 means that the connecting arrangement 2 according to the invention is completely closed off relative to the exterior, with the exception of a small annular gap which remains between the peripheral surface of the branch pipe 3 and the opening in the end portion of the union unit 22, through which the branch pipe 3 passes. That annular gap however is of only a very short axial length which is less than the thickness of the end portion of the union nut 22, as it already the gap terminates at the counter-pressure surface 24. That extremely small gap affords only slight possibilities in regard to the deposit of dirt.

As already mentioned the screwthreaded sockets 12 are preferably fixed to the distributor pipe 1 by welding.

Alternatively it is also possible to use any other form of connection which is as easy to produce and which can carry the forces exerted by tightening of the union nut 22 or by the internal operating pressure which acts in the axial direction on the end of the connecting pipe 3.

If the operation of machining a recess 10 in the peripheral surface of the distributor pipe 1 is to be avoided, it is possible for the end of the screwthreaded socket 12 which serves for fixing to the distributor pipe not to be cut off straight, but to be in the form of an inverted U-shape so that it can be fitted saddle-like on to the outside cylindrical surface of the distributor pipe 1 and fixedly connected thereto.

What is claimed is:

1. A substantially cylindrical fuel distributor pipe which can be subjected to a loading with a high internal pressure and which can be used in internal combustion engines with a common rail system as a high-pressure storage means and which includes at least one connecting arrangement for providing a releasable connection of a branch pipe to the distributor pipe, the arrangement comprising the following components:

a connecting bore (5) having an axis and extending substantially radially through the wall of the distributor pipe (1), and having an inner substantially cylindrical portion (8) and an outer, hollow-conical enlarging portion (9) forming a conical wall adjoining the cylindrical portion and opening to an outer surface of the distributor pipe, a screwthreaded socket (12) which is connected to the distributor pipe (1), which has an internal bore (15) passing therethrough in a continuation of the connecting bore (5), and which is adapted to receive a connecting end of the branch pipe which is to be connected to the distributor pipe, and a screwthreaded pressing element (22) having a pressure surface (23) which, upon screwing of the pressing element (22) with the screwthreaded socket (12), is moved towards the distributor pipe (1) and in so doing applies a force to a counterpressure surface (24) provided on a thickened portion (25) of the branch pipe, by which force a counter-sealing surface (18) provided at the connecting end of the branch pipe is pressed in a pressure-tight manner against said conical wall, functioning as a sealing surface, of the outer portion (9) of the connecting bore (5), wherein said screwthreaded socket (12) is non-integral with the distributor pipe (1), and is fixed at one end thereof directly to the outer surface (7) of the distributor pipe, only, in the immediate vicinity of a connecting region surrounding said conical wall of said outer portion (9) of said connecting bore (5), and without encircling the distributor pipe (3).

2. The fuel distributor pipe according to claim 1, wherein the otherwise cylindrical outer surface of the distributor pipe (1) is flattened in said connecting region for fixing to the non-integral screwthreaded socket (12).

3. The fuel distributor pipe according to claim 1, wherein the non-integral screwthreaded socket (12) is applied in butting relationship against the outer surface of the distributor pipe (1) and is welded to said outer surface.

4. The fuel distributor pipe according to claim 3, wherein the screwthreaded socket (12) has a male screwthread (20), and the pressing element is a female-threaded union nut (22).

5. The fuel distributor pipe according to claim 4, wherein the thickened portion (25) of the branch pipe (3), which has the counter-pressure surface (24), is at an axial spacing from the connecting end of the branch pipe (3), which carries the counter-sealing surface (16), said spacing being sufficiently large that the counter-pressure surface (24), in an assembled condition of the socket and branch pipe projects outwardly beyond the free opposite end of the screwthreaded socket (12).

6. The fuel distributor pipe according to claim 5, wherein the axial length of the inner portion (8) of the connecting bore (5) is greater than the axial length of the outer portion (9).

7. The fuel distributor pipe according to claim 2, wherein the non-integral screwthreaded socket (12) is applied in butting relationship against the outer surface of the distributor pipe (1) and is welded to said outer surface.

* * * * *